United States Patent [19]

Tada

[11] Patent Number: 5,720,682
[45] Date of Patent: Feb. 24, 1998

[54] TENSIONER ARM AND CHAIN GUIDE WITH PASSAGES FOR OIL DRAINAGE

[75] Inventor: Naosumi Tada, Nabari, Japan

[73] Assignee: Borg-Warner Automotive, K.K., Nabari, Japan

[21] Appl. No.: 614,406

[22] Filed: Mar. 12, 1996

[30] Foreign Application Priority Data

Mar. 14, 1995 [JP] Japan ................... 7-083313

[51] Int. Cl.$^6$ ................... F16H 57/04; F16H 7/08
[52] U.S. Cl. ................... 474/91; 474/101; 474/111; 474/140; 184/15.1
[58] Field of Search ................... 474/111, 140, 474/101, 110, 91; 184/15.1, 16

[56] References Cited

U.S. PATENT DOCUMENTS

| | | |
|---|---|---|
| 4,713,043 | 6/1995 | Biedermann . |
| 4,832,664 | 5/1989 | Groger et al. ................... 474/111 |

FOREIGN PATENT DOCUMENTS

| | | | |
|---|---|---|---|
| 3639389 | 5/1988 | Germany ................... | 474/111 |
| 4-119654 | 10/1992 | Japan . | |
| 5-42798 | 6/1993 | Japan . | |
| 7-36201 | 8/1995 | Japan . | |

Primary Examiner—Tamara L. Graysay
Assistant Examiner—Gary S. Hartmann
Attorney, Agent, or Firm—Hugh A. Abrams, Esq.; Greg Dziegielewski, Esq.

[57] ABSTRACT

A tensioner arm and a chain guide are constructed with an oil-escape portion, which is designed to allow for the drainage of oil that collects on the back side of the tensioner arm or chain guide. The oil escape portion is comprised of a through-hole on the back side of the tensioner arm or chain guide or through-holes in the side walls located on the back side of the tensioner arm or chain guide.

4 Claims, 6 Drawing Sheets

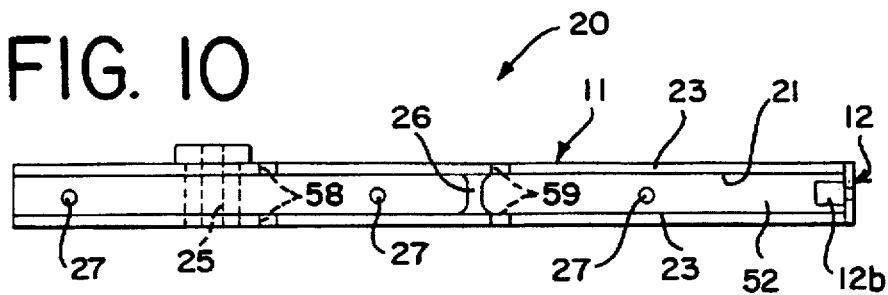
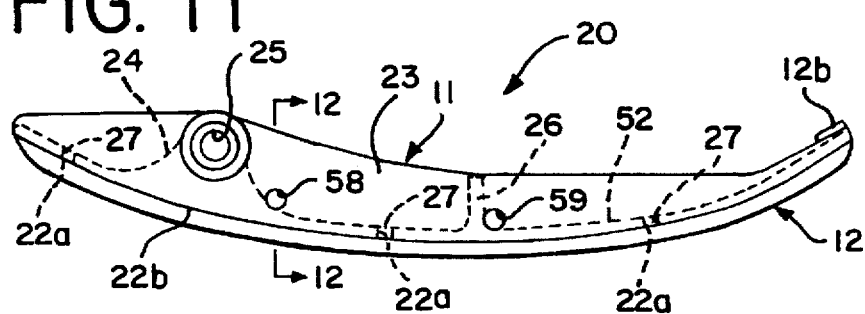
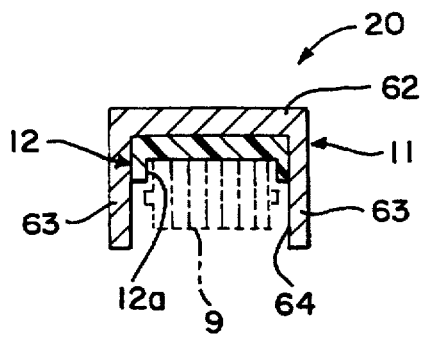
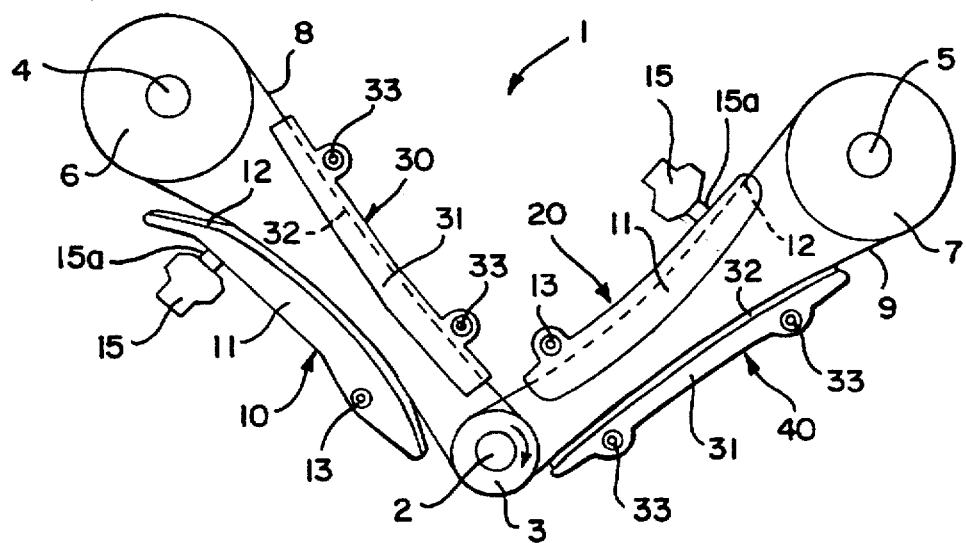

5,720,682

TENSIONER ARM AND CHAIN GUIDE WITH PASSAGES FOR OIL DRAINAGE

BACKGROUND OF THE INVENTION

This invention relates to a tensioner, which provides proper tension to the chain of an engine, and a chain guide, which controls the running position of a chain. The preferred embodiment of the present invention is directed to a construction of a tensioner arm and chain guide, which provides a passage to drain oil that collects in the arm or guide.

In conventional engine timing systems a tensioner arm is placed together with a tensioner on the slack side of the timing chain and a chain guide is placed on the tight side. Generally, these tensioner arms and chain guides are made of metal, such as aluminum, and a concave part is often formed on the back sides (opposite to the chain contact side) for weight reduction and material savings.

In the timing system of a V-engine, engine oil splashed during engine operation to lubricate the chain components tends to settle in the concave portions on the back sides of the tensioner arm and chain guide, which are installed at an angle to the horizontal. The oil which has settled in the concave parts remains stationary and does not circulate in the engine. Therefore, the oil properties can deteriorate especially when the engine is stopped for a long period.

The present invention provides for a tensioner arm and chain guide which will address this conventional problem and prevent the deterioration of engine oil properties by permitting the oil to escape or drain from the tensioner arm and the chain guide.

SUMMARY OF THE INVENTION

The tensioner arm of the present invention, which is designed to increase tension on the chain in an engine, is constructed with an oil-escape portion, which is designed to allow for the drainage of oil that collects in the back side of the tensioner arm. The oil escape portion is preferably comprised of a through-hole from the back side of the tensioner to the chain contact side. In an alternative embodiment, the oil escape portion is comprised of through-holes in the side walls located on the back side of the tensioner arm. In yet another alternative embodiment, the oil escape portion is comprised of a bottom wall that extends horizontally along the back side of the tensioner arm at the position where the tensioner arm is attached to the engine block.

The chain guide of the present invention, which controls the running position of the chain in an engine, includes an oil escape portion for the escape of oil deposited on the back side of the chain guide. The oil escape portion is preferably comprised of a through-hole from the back side of the chain guide to the chain contact side. In an alternative embodiment, the oil escape portion is comprised of a through-hole in the side walls located on the back side of the chain guide. In yet another alternative embodiment, the oil escape portion is comprised of a bottom wall that extends in a nearly horizontal direction along the back side of the chain guide at the position where the chain guide is attached to the engine block.

The tensioner arm and chain guide of the present invention each prevent the settling of oil for a long period of time on the back side of the tensioner arm or chain guide. Oil collection is prevented due to the provision of an oil-escape portion, allowing for the drainage of oil, on the back side of the tensioner arm. As a result, the collection of oil in a stagnant location, with the resultant deterioration of the engine oil properties, is prevented.

Other objects, features and advantages of the present invention will become apparent from the following detailed description when read in conjunction with the accompanying drawings.

BRIEF DESCRIPTION OF THE DRAWINGS

FIG. 10 is a top view of a second alternate embodiment of the tensioner arm of the present invention corresponding to FIG. 2.

FIG. 11 is side view of the second alternate embodiment of the tensioner arm of the present invention corresponding to FIG. 3.

FIG. 14 is a sectional view of the third alternate embodiment of the tensioner arm of the present invention corresponding to FIG. 7.

FIG. 15 is a side view of the timing system of a V-engine to which the tensioner arm and chain guide of the third alternate embodiment, illustrated in FIG. 14, are applied. This figure corresponds to FIG. 1.

DETAILED DESCRIPTION OF THE PREFERRED EMBODIMENTS

Figure 1:
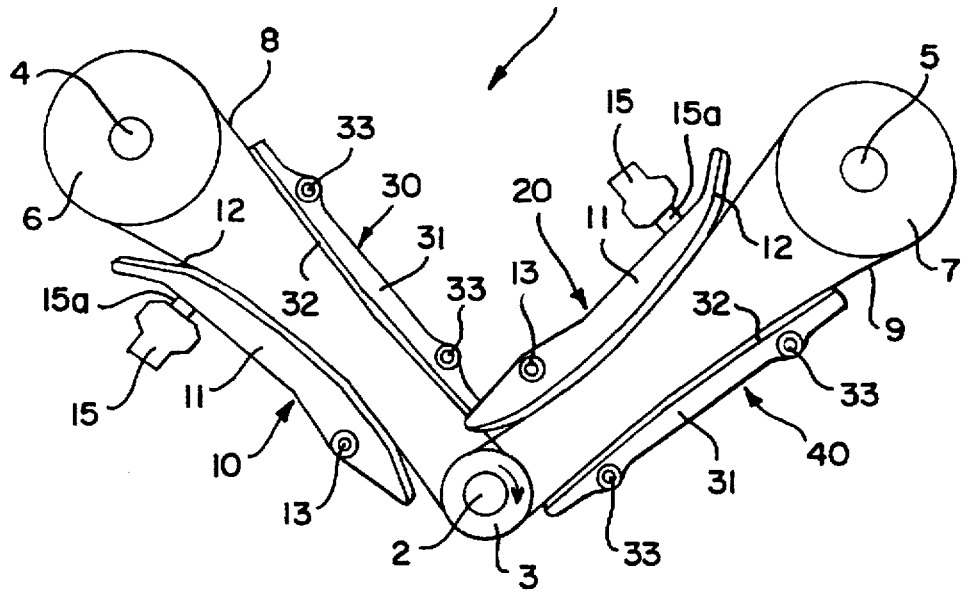
FIG. 1 is a side view of the timing system of a V-engine to which the tensioner arm and chain guide of one embodiment of the present invention are applied.
Figure 2:
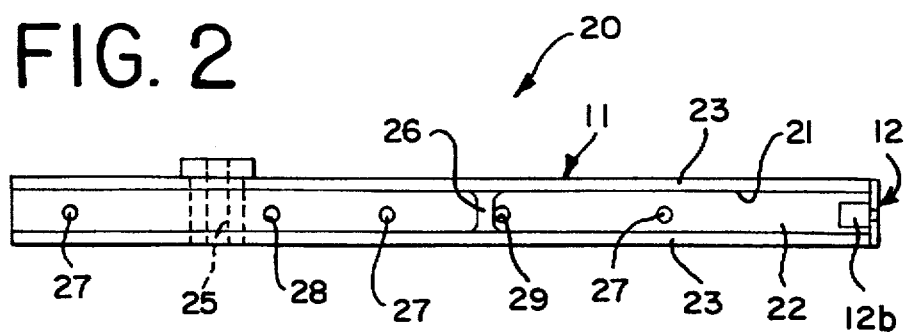
FIG. 2 is a top view of one preferred embodiment of the tensioner arm of the present invention.
Figure 3:
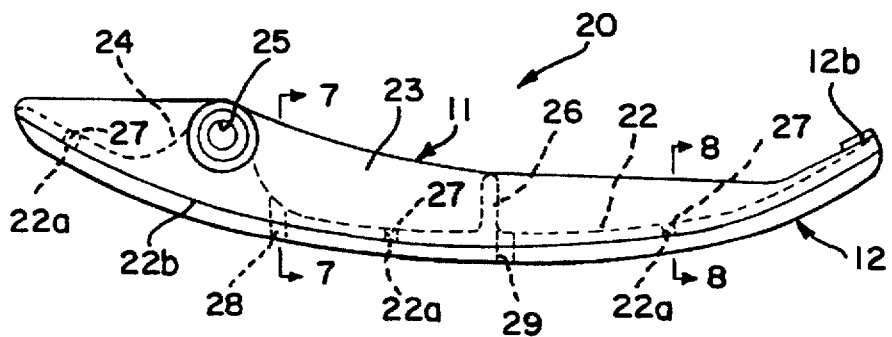
FIG. 3 is a side view of one preferred embodiment of the tensioner arm of the present invention.

Turning now to the drawings, FIG. 1 depicts a V-engine timing system to which the tensioner arm and chain guide of the present invention are applied. This engine embodiment has two separate engine banks each of which operates in a similar manner. Each engine bank includes its own camshaft 4, 5, sprockets 3, 6 and 7, and timing chain 8, 9. However, the entire engine system has only one crankshaft 2. The engine timing system 1 has two drive sprockets 3, 3 which are attached to a crankshaft 2. The driven sprockets 6, 7 are attached to camshafts 4, 5, respectfully. One timing chain 8 is placed around sprockets 3, 6 and the second timing chain is placed around sprockets 3 and 7. The arrow mark in FIG. 1 indicates the rotational direction of the crankshaft 2.

Tensioner arms 10, 20, which are designed for the addition of tension to the timing chain, and chain guides 30, 40, which are designed for guiding and regulating the running position of the timing chain, are placed on the slack side and tight side of the timing chains 8 and 9, respectfully.

The tensioner arms 10, 20 are comprised of a main body 11 which is made of aluminum die cast, for example, and shoes 12 made of rubber or resin, such as nylon. The shoes (sliding member) 12 are mounted on the main body 11 on the chain contact side of each tensioner arm 10, 20. Bolt 13, which provides rotatable support for the arm body 11, is inserted in the hole formed in one end of the arm body 11. The bolt 13 is fixed with a screw to the side wall of the engine. The hydraulic tensioner 15 is placed on the opposite (free end) of the arm body 11 and its plunger 15a presses the arm body 11 toward the chain contact side.

Similar to the tensioner arms 10, 20, the chain guides 30, 40 are comprised of a guide body (main body) 31 which is made of aluminum die cast, for example, and shoes 32 made of rubber or resin, such as nylon. The shoes 32 are mounted on the chain contact side of the guide body 31. The guide body 31 is fixed to the engine side wall by bolts 33 inserted in the holes in both of its ends.

As shown in FIGS. 2, 3, 7 and 8, a lengthwise concave portion 21 is formed on the back side (opposite to the chain contact side) of the arm body 11 of the tensioner arm 20. The arm body 11 is comprised of a bottom wall 22, to which shoe 12 is mounted, and side walls 23, 23, which extend up from the (transverse) widthwise edges. A thick material portion 24 is formed, in continuation to bottom wall 22, toward one end of the arm body 11. A hole 25, for insertion of bolt 13, shown more clearly in FIG. 1, is formed through this thick portion 24 and the side walls 23, 23. In addition, a reinforcement rib 26 is provided near the lengthwise center of the arm body 11.

Figure 8:
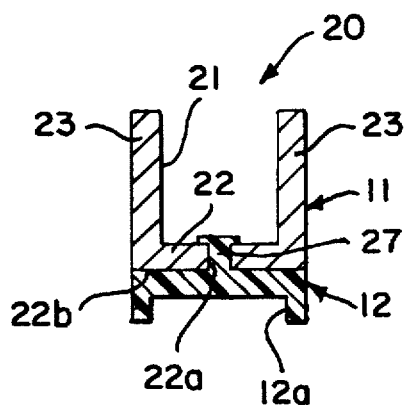
FIG. 8 is a sectional view of the tensioner arm of the present invention along line VIII—VIII in FIG. 3.

Protrusions 27, that protrude toward the side of the arm body 11, are preferably formed at three locations on the shoe 12 of the tensioner arm 20. Engagement holes 22a, for engagement of said protrusions 27, are formed at three locations on the bottom wall 22 of the arm body 11. One end 12b of the shoe 12 is engaged with the end of the arm body 11 for the purpose of mounting the shoe 12 onto the arm body 11. At the same time, the entire shoe is mounted onto the curved surface 22b of the arm body bottom wall 22. At this time, protrusions 27 of shoe 12 are engaged with the corresponding engagement holes 22a on the side of the arm body 11, and the tips of the protrusions 27 are welded, as shown in FIG. 8. As a result, shoe 12 is fixed to the arm body 11. Also, the engagement concave portion 12a is formed in the shoe 12 for running the timing chain 9.

Through-holes 28, 29 are formed in the arm body 11 of the tensioner arm 20 and the shoe 12. Through-hole 28 is designed for the escape or drainage of settled engine oil in the concave portion 21 (concave on the left of rib 26 in FIG. 3) of the tensioner arm 20 to the side of the timing chain 9. The through-hole 28 is surrounded by the thick material portion 24, the rib 26, the side walls 23, 23 and the bottom wall 22. The through-hole 28 is formed in the bottom wall 22 at the foot of the thick material portion 24. In addition, the location of the through-hole 28 is the first point of contact of the timing chain 9 onto the tensioner arm, at the position where the tensioner arm 20 is attached to the engine (See FIG. 1 and 6).

Through-hole 29 is designed for the drainage or escape of engine oil that settles in the concave portion 21 (concave on the right rib 26 in FIG. 3) of the tensioner arm to the side of the timing chain 9. The through-hole 29 is surrounded by rib 26, the side walls 23, 23 and the bottom wall 22. The through-hole is formed in the bottom wall 22 at the foot of the rib 26. As noted above, the through-holes 28, 29 are formed at the lowest positions in the concave portion 21, at the attachment position of the tensioner arm 20.

Tensioner arm 10 is comprised in a similar manner to tensioner arm 20 above. However, tensioner arm preferably does not contain through-holes 28, 29. Therefore, an explanation regarding tensioner arm 10 will be omitted.

Figure 4:
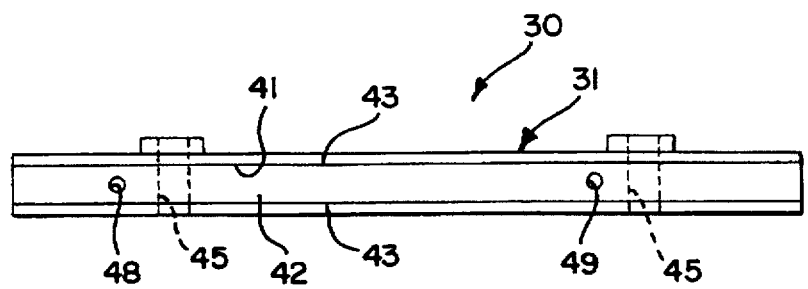
FIG. 4 is a top view of one preferred embodiment of the chain guide of the present invention.
Figure 5:
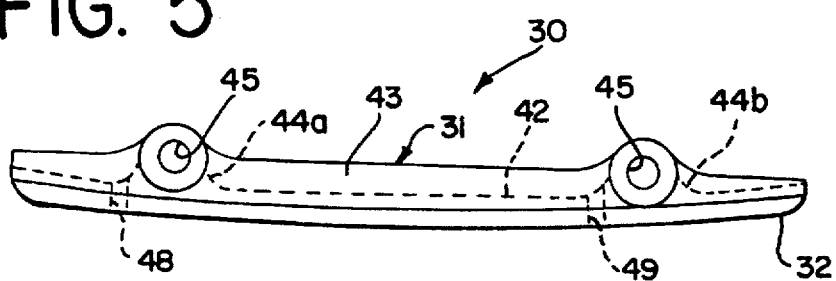
FIG. 5 is a side view of one preferred embodiment of the chain guide of the present invention.

The lengthwise concave portion 31, which is formed on the backside of the guide body 31 of the chain guide 30, is constructed in a similar manner to that of the arm body 11 of the tensioner arms 10, 20 (FIG. 4 and FIG. 5). The guide .body 31 is comprised of bottom wall 42, on which a shoe 32 is mounted, and side walls 43, 43 that stand up on its widthwise (transverse) edges. Thick material portions 44a, 44b are formed toward the ends of the guide body 41, in continuation of the bottom wall 42. Holes 45 for the insertion of bolts 33 (FIG. 1) are formed in the thick material portions 44a, 44b and the side walls 43, 43.

Protrusions are formed on shoe 32 for engaging with the engagement holes in the guide body 31 (not shown in FIG. 4 and FIG. 5). Similar to the tensioner arms 10, 20 described above, the protrusions are engaged in the corresponding engagement holes on the side of the guide body and the tips of the protrusions are welded to attach shoe 32 onto guide body 31.

Through-holes 48, 49, similar to the through-holes formed in the tensioner arm 20, which are designed to allow for the escape of oil, are formed in the guide body 31 of the chain guide 20 and the shoe 32. Through-hole 48 is designed to allow the escape of engine oil settled in the concave portion 41 of the chain guide 20 onto the side of the timing chain 8. The through-hole 48 is surrounded by the thick material portion 44a, the side walls 43, 43 and the bottom wall 42. The through-hole is formed near the foot of the thick material portion 44a. Similarly, through-hole 49 is designed to allow the escape of engine oil settled in the concave portion 41 of the chain guide 20 onto the side of the timing chain 8. The through-hole 49 is surrounded by the thick material portion 44a, 44b, the side walls 43, 43 and the bottom wall 42. The through-hole is formed in the bottom wall 42 at the foot of the thick material portion 44b. In addition, through-holes 48, 49 are located at the lowest positions in the concave portion 41, at the attachment position of the chain guide 30 (see FIG. 1).

Chain guide 40 is comprised in a similar manner to chain guide 30 above. However, chain guide 40 does not contain through-holes 48, 49. Therefore, an explanation regarding chain guide 40 will be omitted.

Figure 6:
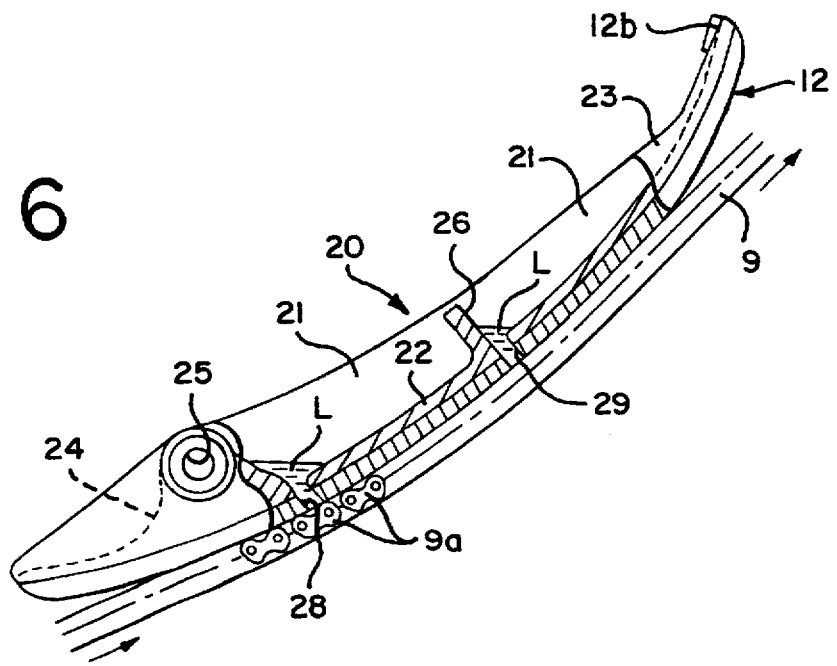
FIG. 6 is side view of one preferred embodiment of the tensioner arm of the present invention illustrating the functional effect of the tensioner arm of the present invention.

FIG. 6 illustrates the functional effect of the preferred embodiment of the present invention. Engine oil, which splashes during the operation of the timing system 1, enters into the concave portion 21, 41 on the back sides of the tensioner arm 20 and chain guide 30, respectfully. Only the tensioner arm 20 is depicted and explained in FIG. 6. However, the effect is similar for the chain guide 30. FIG. 6 utilizes link plates 9a to illustrate the composition of the timing chain 9.

Oil L, which settles in the concave portion 21 at the bottom and top of rib 26, passes through the through-holes 28, 29, which are located at the lowest position of the concave portion 21, and drains onto the side of the timing chain 9. As a result, the long-term settling of oil in the concave portion 21, on the back side of the tensioner arm 20, is prevented. The oil can be circulated in the engine and, as a result, deterioration of oil properties can be prevented.

In the conventional V-engine only a small amount of oil is supplied between the sliding part of the tensioner arm and the timing chain. Therefore, wear on the shoe is severe and the friction between the shoe and the timing chain can be excessive. However, the preferred embodiment of the present invention solves this problem by providing through-holes 28, 29 through which oil is supplied to the shoe 12 and the timing chain 9. In addition, generally, the shoe 12 tends to wear at the entrance location of the timing chain 9. However, by opening a through-hole 28 on the side of the shoe 12, at the entrance location of the timing chain, the wear of the shoe 12 can be reduced.

Figure 7:
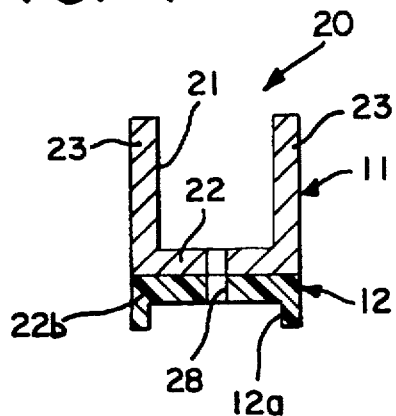
FIG. 7 is a sectional view of the tensioner arm of the present invention along line VII—VII in FIG. 3.
Figure 9:
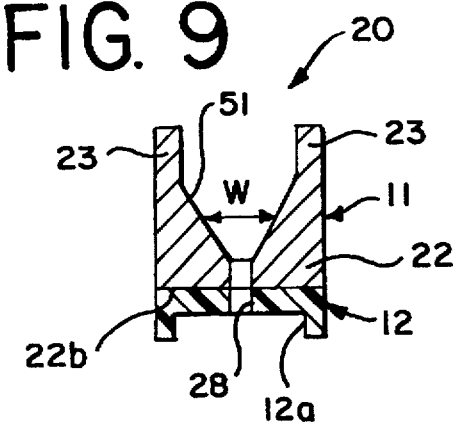
FIG. 9 is a cross sectional view of a first alternate embodiment of the tensioner arm of the present invention corresponding to FIG. 7.

FIG. 9 depicts another embodiment of the present invention, where the concave portion on the back side of the tensioner arm 20 and chain guide 30 is not constructed with a rectangular cross-sectional view (FIG. 7 and FIG. 8), but has a wedge-like concave portion 51. The application of this embodiment of the present invention to the tensioner arm 20 and the numbers in FIG. 7 are applicable to FIG. 9. This embodiment of the present invention can be applied to both a tensioner arm 20 and a chain guide 30. Therefore, the application of this embodiment of the present invention is only explained regarding a tensioner arm 20.

In FIG. 9, wedge-like concave portion 51 has a narrower width W towards its bottom. Therefore, oil in the concave portion 51 will tend to settle at the bottom. As a result, oil in the concave portion 51 is easily led to the through-holes 28, 29 allowing for the smooth discharge of oil through the through-holes 28, 29 onto the timing chain 9.

Figure 12:
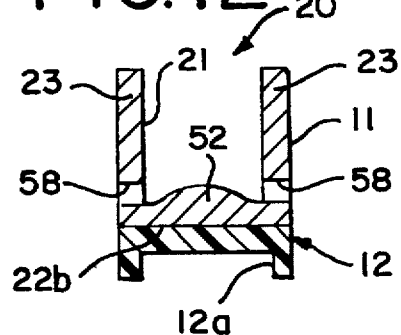
FIG. 12 is a sectional view of the second alternate embodiment of the tensioner arm of the present invention along line XII—XII in FIG. 11.

In the preferred embodiment of the present invention and the first alternate embodiment of the present invention (FIG. 9) the through-holes in the tensioner arm 20 and the chain guide 30, which provide for the escape of oil, are formed in the bottom walls 22, 42 of the arm body 11 and the guide body 31. However, this invention is not limited to the above embodiments. FIG. 10–FIG. 12 depict another embodiment of the present invention illustrating the through-holes 58, 59 formed in the side walls 23, 23 of the tensioner arm 20 and the chain guide 30. FIGS. 10, 11, and 12 correspond to FIGS. 2, 3, and 7 of the preferred embodiment of the present invention, respectfully. Thus, the application of this embodiment of the present invention to the tensioner arm 20 and the corresponding numbers in the above-referenced figures indicate the corresponding parts. This embodiment of the present invention can be applied to both a tensioner arm 20 and a chain guide 30. Therefore, the application of this embodiment of the present invention is only explained in relation to a tensioner arm 20.

In FIGS. 10–12, the through-hole 58 are formed in the side walls 23, 23 at the foot of the thick material portion 24 and through-hole 59 is formed in the side walls 23, 23 at the bottom of the rib 26. In addition, bottom wall 52 of arm body 11 is raised at its widthwise (transverse) center (FIG. 12). Therefore, oil in the concave portion 21 can be easily led to the through-holes 58, 59 allowing for the smooth discharge of oil through the through-holes 58, 59 onto the timing chain 9.

In the preferred embodiment of the present invention and the first and second alternate embodiments of the present invention (FIGS. 9–12) the oil escape portions, designed to allow the escape of oil that settles on the back side of the tensioner arm 20 and chain guide 30, are comprised of through-holes. However, this invention is not limited to the above embodiments.

Figure 13:
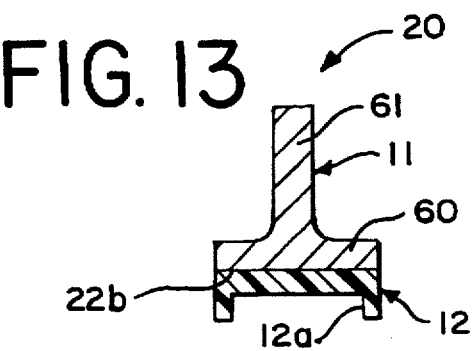
FIG. 13 is a sectional view of a third alternate embodiment of the tensioner arm of the present invention corresponding to FIG. 7.

FIG. 13 depicts an arm body 11 which is comprised of a member with an inverted T cross-section consisting of bottom wall 60 and standing wall 61. In this embodiment of the present invention the concave portion in which oil settles is not formed on the back side of the tensioner arm 20. Thus, the shape of the tensioner arm itself comprises the oil-escape portion.

The cross-section of arm body 11 is not limited to an inverted T shape. The cross-section may also have an I shape. In both cases, weight of the arm body 11 can be reduced. FIG. 13 corresponds to FIG. 7 of the preferred embodiment of the present invention. Thus, the application of this embodiment of the present invention to the tensioner arm 20 and the corresponding numbers in the above-referenced figure indicate the corresponding parts. This embodiment of the present invention can be applied to both a tensioner arm 20 and a chain guide 30. Therefore, the application of this embodiment of the present invention is only explained in relation to a tensioner arm 20.

FIG. 14 depicts another embodiment of the present invention illustrating the arm body 11 comprised of bottom wall 62 and side walls 63, 63 that extend from its widthwise (transverse) edges on the chain contact side. In this embodiment of the present invention the concave portion 64 of the arm body 11 is formed on the chain contact side and the timing chain 9 is stored in the concave portion 64. This embodiment of the present invention can be applied to both the arm body 11 of a tensioner arm and the guide body 31 of chain guide 30. Therefore, the application of this embodiment of the present invention is only explained in relation to the tensioner arm 20.

FIG. 15 illustrates the application of the tensioner arm 20 and chain guide 30, comprised of a cross-section described in FIG. 14, to the engine timing system in FIG. 1. In this embodiment, the flat surface of the bottom wall 62 is positioned on the back side of the tensioner arm 20 and the chain guide 30. The result is that no concave portion, in which oil can settle, is formed. Therefore, the shape of the tensioner arm 20 itself composes the oil-escape portion, similar to FIG. 13.

In addition, as shown in FIG. 15, most of each side wall 63 is positioned within the inside space of chains 8 and 9. Therefore, the volumes of the tensioner arm 20 and the chain guide 30 outside of the chains can be reduced to achieve a higher degree of design freedom for other parts. In addition, in the case of an aluminum die cast tensioner arm 20 and chain guide 30, designed for higher rigidity, generally their cross-sections can be smaller than those of the resin parts. Therefore, the overall size can be reduced and more space outside of the chains can be freed.

In FIG. 15, when the same cross-section is applied to both the tensioner arm 10 and the chain guide 40 less space outside of the chains of the timing system is occupied by the tensioner arm and chain guide. Also, the concave portions are positioned on the chain contact side of the tensioner arm 20 and the chain guide 40. Therefore, the collection of oil in the concave portions becomes easier. As a result, lubrication of the shoe 12 is improved and the wear of the chain 9 is reduced. In this embodiment, the introduction of oil to the chain running portion or to the engagement concave portion 12a becomes easier if the cut-out, is formed in the side wall of the shoe 12.

Figure 16:
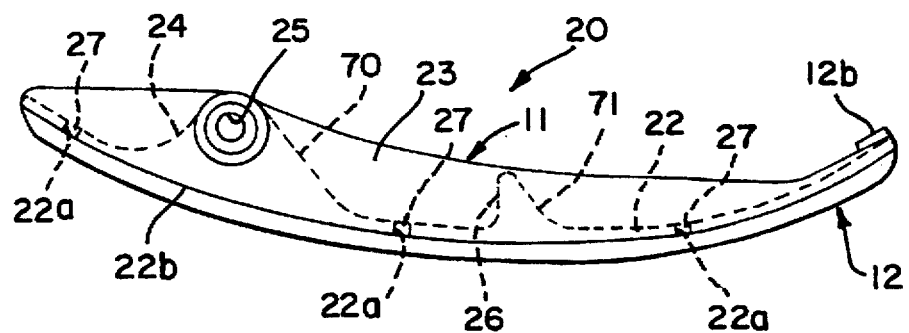
FIG. 16 is a side view of a fourth alternate embodiment of the tensioner arm of the present invention corresponding to FIG. 3.
Figure 17:
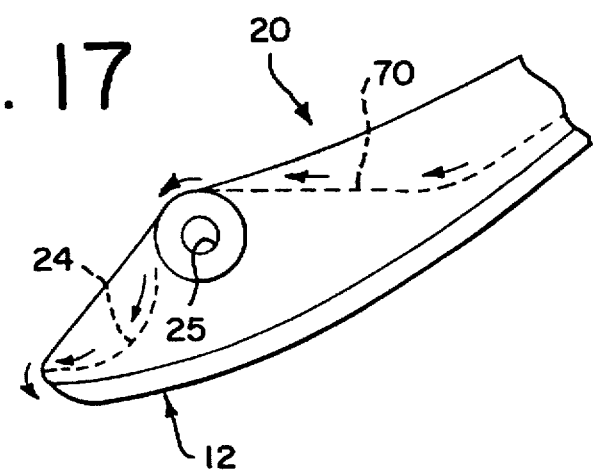
FIG. 17 is a side view of the fourth alternate embodiment of the tensioner arm of the present invention, corresponding to FIG. 6, illustrating the functional effect of the tensioner arm of the present invention.

In the preferred embodiment of the present invention and the first, second, and third alternate embodiments of the present invention the oil-escape portions are located on the back sides of the tensioner arm 20 and the chain guide 30. However, this invention is not limited to the above embodiments. For example, as shown in FIGS. 16 and 17, flat and gradually inclined surfaces can be formed in the thick material portion 70 towards the center of the arm body 11 and on the rear face 71 of the rib 26 (in nearly the same direction as the thick material portion 70—the right side face in FIG. 14) for comprising the oil-escape portions. FIGS. 16 and 17 correspond to FIGS. 3 and 6 of the preferred embodiment of the present invention, respectfully. Thus, the application of this embodiment of the present invention to the tensioner arm 20 and the corresponding numbers in the above-referenced figures indicates the corresponding parts. This embodiment of the present invention can be applied to both a tensioner arm 20 and a chain guide 30. Therefore, the application of this embodiment of the present invention is only explained in relation to a tensioner arm 20.

When the tensioner arm 20 is positioned at its attachment position, shown more clearly in FIG. 1, the thick material portion 70 is horizontally positioned or in a slightly downward angle and the same is true for the rear face 71 of the rib 26. Therefore, oil in the concave portion on the back side of the tensioner arm 20 moves down through the inclined surface of the thick material portion 70, as shown in FIG. 17 by the arrow mark. The oil is then discharged through the thick material portion 24. Therefore, oil settling in the concave portion on the back side of the tensioner arm can be prevented.

Figure 18:
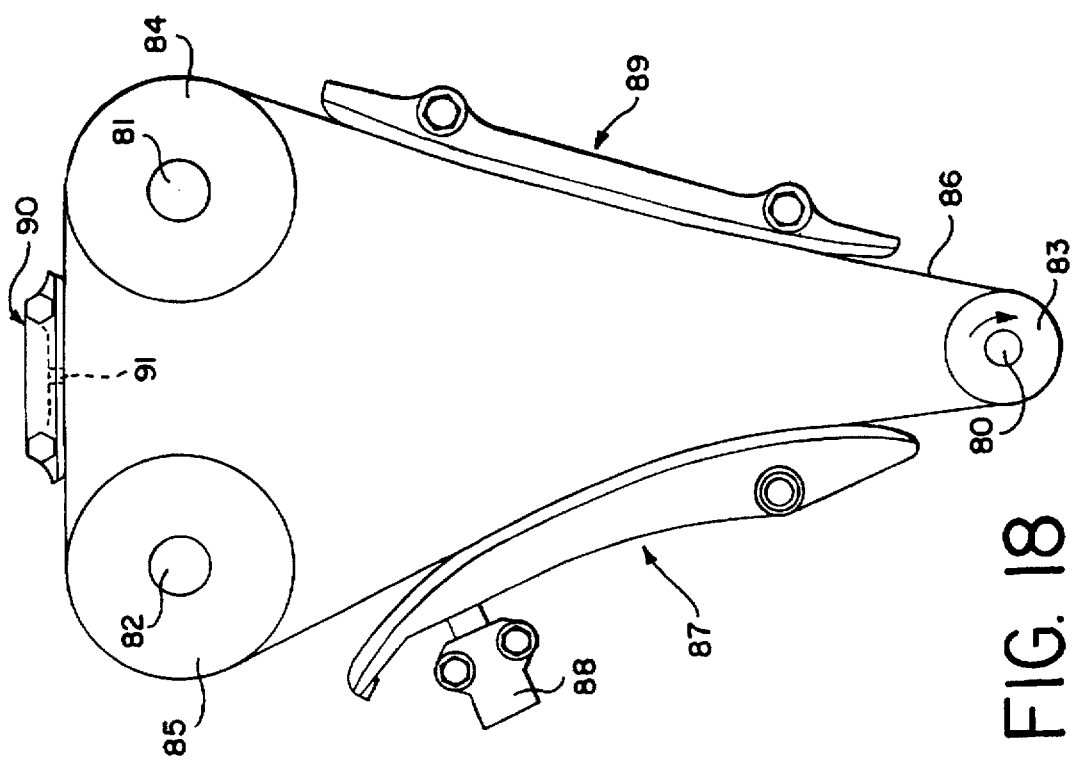
FIG. 18 is a side view of an in-line dual overhead cam (DOHC) engine timing system illustrating the application of the present invention.

The preferred embodiment of the present invention and the alternate embodiments of the present invention illustrate the application of this invention to the timing system of a V-engine. However, this invention is not limited to V-engine timing systems. FIG. 18 illustrates the application of the present invention to the timing system of an in-line DOHC engine.

In FIG. 18, the crankshaft 80 is attached to the drive sprocket 83 and the camshafts 81 and 82 are attached to the driven sprockets 84 and 85, respectfully. The timing chain 86 is placed across the drive sprocket 83 and the driven sprockets 84 and 85. The tensioner arm 87 and the tensioner 88 are placed on the slack side of the timing chain 86 and the chain guide 89 is placed on the tight side of the timing chain 86. This tensioner arm 87, tensioner 88 and chain guide 89 are comprised in the same manner as tensioner arm 10, tensioner 15 and chain guide 40 of FIG. 1, respectfully.

Chain guide 90, designed for guiding a timing chain 86, is located across the driven sprockets 84 and 85. Through-hole 91, designed for the escape of oil settled in the concave portion on the backside, is formed in the lengthwise center of the chain guide 90. Since the chain guide 90 is positioned horizontally oil tends to settle in the concave portion on the back side of the chain guide. However, the oil is easily discharged from the concave portion through the through-hole 91.

Figure 19:
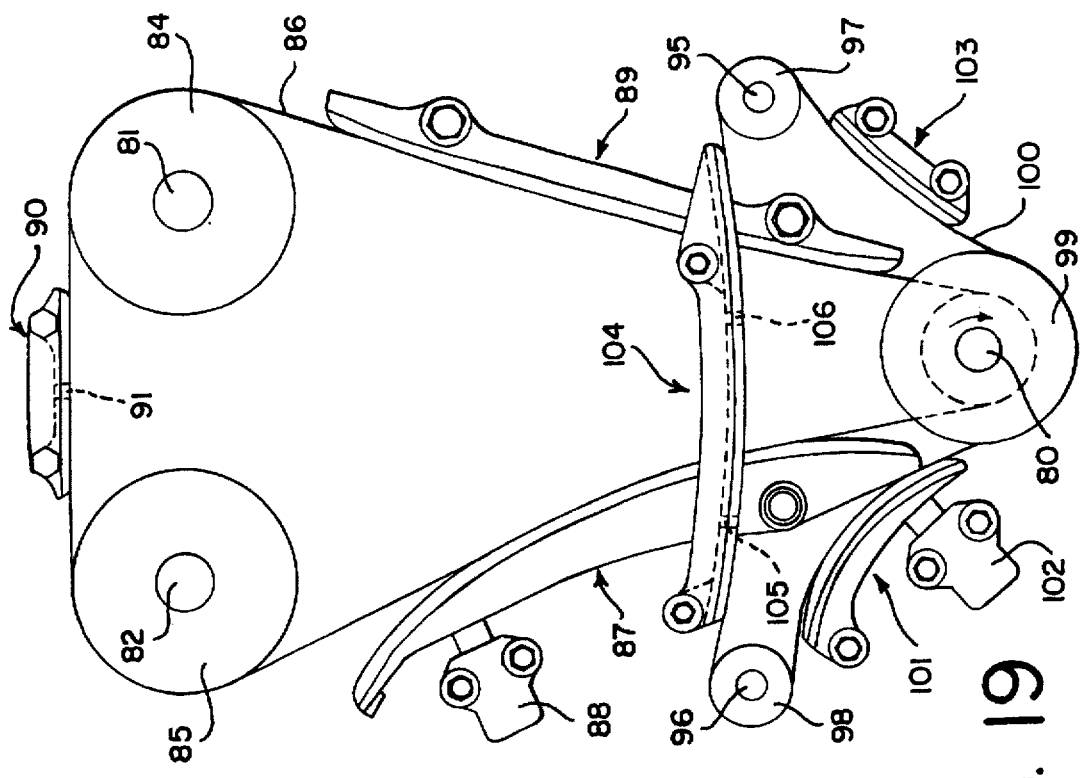
FIG. 19 is a side view of an accessory driving system and timing system of an in-line DOHC engine illustrating the application of the present invention.

FIG. 19 illustrates the application of the present invention to the balancer drive, in addition to the above timing system (FIG. 18). FIG. 19 utilizes the numbers used in FIG. 18 to indicate the corresponding parts.

In FIG. 19, the balancer chain 100 is positioned across driven sprockets 97 and 98 on the balancer shafts 95 and 96, respectfully, and the drive sprocket 99. Tensioner arm 101 and tensioner 102 are positioned on the slack side of the balancer chain 100 and the chain guide 103 is positioned on the tight side of the balancer chain 100. A chain guide 104, for guidance of the balancer chain 100, is also placed between the driven sprockets 97 and 98.

Through-holes 105 and 106 are formed in the concave portion on the backside of the chain guide 104. The through-holes 105 and 106 are designed to allow oil settled in the concave portion of the chain guide to escape. Since the chain guide 104 is positioned horizontally oil tends to settle in the concave portion on the backside of the chain guide, similar to chain guide 90. However, the oil in the concave portion can easily be discharged through the through-holes 105, 106.

The present invention can also be applied to the timing system in a tilt-mounted in-line engine or an accessory driving chain for an oil pump, generator, etc. In all of these situations the present invention is effective when the tensioner arm and chain guide are positioned in a horizontal direction or a tilted condition.

As indicated by the embodiments of the present invention, the utilization of the tensioner arm and chain guide of the present invention prevent the long-term settling of oil on their back sides and, therefore, the deterioration of oil properties can be prevented.

Those skilled in the art to which the invention pertains may make modifications and other embodiments employing the principles of this invention without departing from its spirit or essential characteristics, particularly upon the foregoing teachings. The described embodiments are to be considered in all respects only as illustrative and not restrictive, and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A chain system having a chain, a plurality of sprockets and a chain guide, said chain being wrapped around at least a pair of said sprockets with said chain guide positioned between said pair of sprockets, said chain guide comprising:

a concave portion having a surface contacting a tight strand portion of a chain, first and second ends mounted in a fixed position, said concave portion positioned in said chain system to form an area for collection of hydraulic fluid from said chain system, said collection area being formed in said concave portion on a side opposite said chain contacting surface, a plurality of fluid drainage apertures to permit passage of said hydraulic fluid from said collection area through said concave portion.

2. The chain guide of claim 1 wherein each of said drainage apertures further comprises a fluid conduit through said concave portion of said chain guide.

3. The chain guide of claim 1, wherein each of said drainage apertures further comprises a plurality of horizontally positioned fluid conduits.

4. The chain guide of claim 3, wherein said drainage apertures are located in raised side walls of said concave portion.

* * * * *